Feb. 1, 1966 R. L. GALE ETAL 3,232,000
COMBINED ENTRY AND COVER FOR A LOBSTER TRAP
Filed June 6, 1963 2 Sheets-Sheet 1
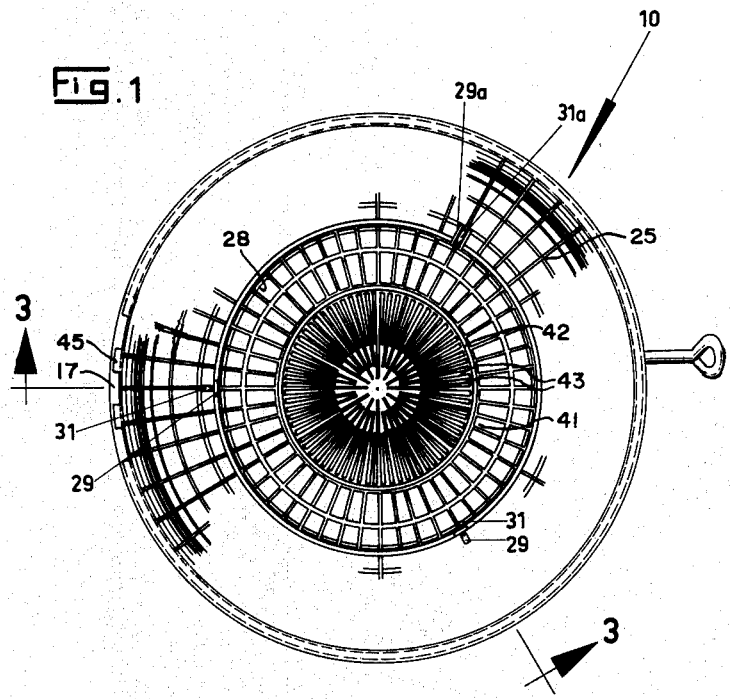
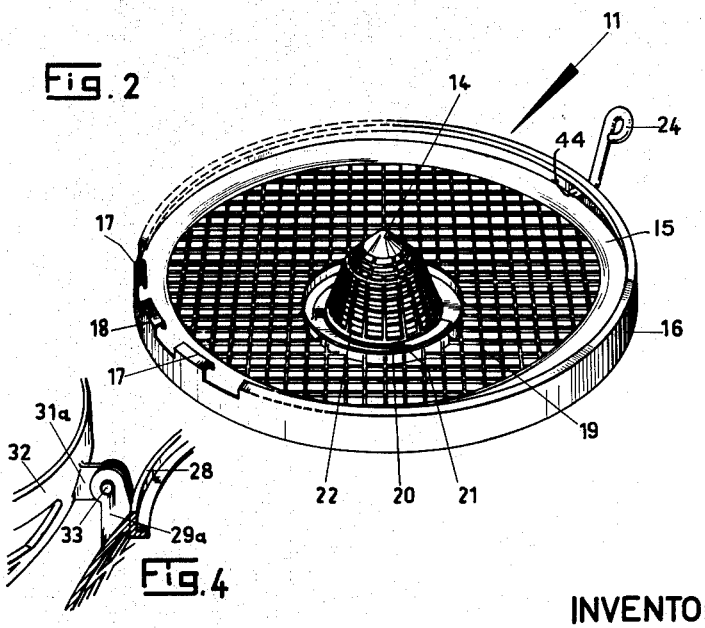
INVENTORS
R. Reginald Leslie Gale
Margaret Gale Feb. 1, 1966   R. L. GALE ETAL   3,232,000
COMBINED ENTRY AND COVER FOR A LOBSTER TRAP
Filed June 6, 1963   2 Sheets-Sheet 2

INVENTORS
Reginald Leake Gale
Margaret Gale

United States Patent Office
3,232,000
Patented Feb. 1, 1966

3,232,000
COMBINED ENTRY AND COVER FOR A
LOBSTER TRAP
Reginald Leake Gale and Margaret Gale,
Calgary, Alberta, Canada
Filed June 6, 1963, Ser. No. 286,060
6 Claims. (Cl. 43—100)

This invention relates to improvements in traps for marine life and in particular, to improvements in such traps which are usually referred to as lobster pots.

Our invention is an improvement over lobster traps of the prior art by providing a trap fabricated from plastic or similar material which among other advantages is substantially non-corrodible, light in weight and able to be dismantled and stacked for storage purposes.

In addition to these advantages our invention seeks to improve over the prior art by providing a lobster pot having an improved trap entry which positively prevents the escape of lobsters or other like marine life therefrom once they have entered the pot.

Another object of our invention is to provide a lobster pot which will prevent the lobster or the like from withdrawing from the trap entry even though not fully entered.

Still another object of the invention is to provide a lobster pot having an improved entry, which once the lobster or the like has begun to investigate the entry, will prod the lobster into entering the pot.

These and other objects and features of the invention will become apparent when the following description is read in conjunction with the accompanying drawings, in which:

FIG. 1 is a plan view of a lobster pot embodying the present invention.

FIG. 2 is a perspective view of the base member and bait trap of the lobster pot.

FIG. 4 is an enlarged, fractional perspective view of the hinge attaching the top entry portion to the body of the invention.

Figure 3:
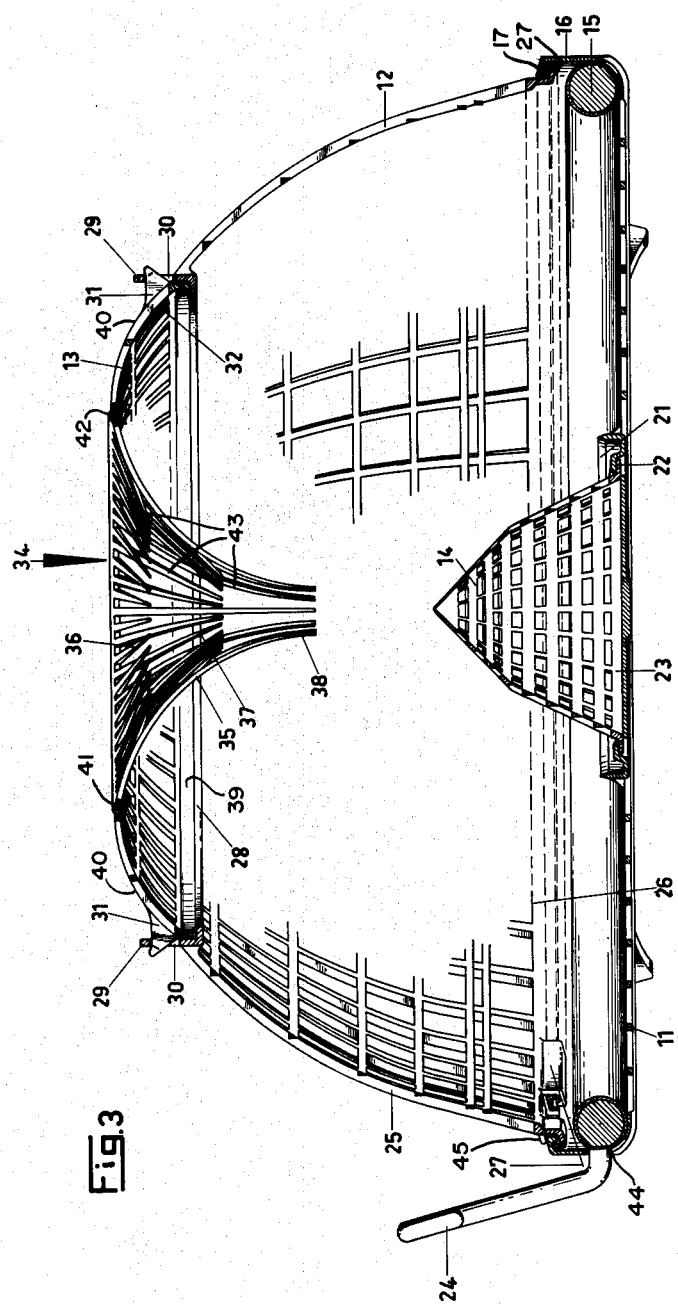
FIG. 3 is an enlarged sectional side elevation of the lobster pot shown in FIG. 1 taken on the line 3—3.

Referring to FIG. 1 and FIG. 3, a lobster pot 10 comprises a base portion 11, a body portion 12 located on said base portion and a top entry portion 13 attached to the upper end of body portion 12. A bait box 14 is detachably secured to the center of base 11.

Referring to FIG. 2 and FIG. 3, base 11 is preferably circular, housing a toroidal weight ring 15 within an upwardly extending short cylindrical wall 16 integral with the base. A plurality of equi-angularly spaced sectoral inverted channel members 17 formed in the upper edge 18 of the wall 16 and spaced slightly above the weight ring 15 serve to retain the ring captive and also provide means to connect the base with the body portion. The bottom wall 19 of base 11 is preferably of an open mesh material with an unapertured center disc portion 20 which carries the female retaining sectors 21 of a bayonet connection, the lower sectoral flanges 22 of bait box 14 forming the male portion of the bayonet connection which is received between sectors 21 and base disc portion 20.

Bait box 14 is also formed of mesh material, its open end 23 being defined by the plane of lower sectoral flanges 22 and being closed off by the material of bottom wall 20 on being assembled.

A towing eye 24 of strong rigid material extends outwardly and upwardly from weight ring 15 through an aperture 44 in the wall 16 to facilitate raising and lowering pot 10 and in a preferred embodiment, weight ring 15 and towing eye 24 are formed of iron bar material. Wall 16 is effectively stiffened by the weight ring seated inside it, and the entire trap assembly receives bracing and support in handling from the ring.

Referring particularly to FIG. 3, body 12 comprises open mesh side walls 25 formed by integral ribs and rings and is open at each end, the lowermost ring 26 having the larger diameter and being formed with a series of sectoral, upwardly opening channels 27 extending outwardly from the body and being adapted to enter into locked engagement with complementarily formed channels 17 of base 11.

Due to the nature of the material forming base 11 and body 12, which is preferably a heavy duty, fairly rigid plastic material, channels 27 of body portion 12 may be snap fitted into the wall 16 of base 11, or may be secured thereto as shown by a modified bayonet type connection, permitting locked assembly to be effected by axially interfitting channels 17 between base channels 27 and then relatively rotating the body portion with respect to the base until the channels are inter-engaged in registering relation as shown by FIG. 1. Radial sectoral flanges 45 spaced above the gaps between channel members 27 and extending over the ends of members 27 serve to frictionally grip the base channels 17 upon assembly therewith and to prevent axial movement between the body portion and base.

The upper end of body 12 is also defined by a rim 28 from which a plurality of equally spaced apart tabs 29 extend upwardly, said tabs having each a vertical slot 30 formed therein.

Referring to FIG. 1 and FIG. 3, each slot 30 in tabs 29 is adapted to receive an interlocking lug 31 which extends radially outwardly from the lower end 32 of top entry portion 13. Tabs 29 are sufficiently resilient to permit them to bend outwardly while lugs 31 are being pushed downwardly against them and then to snap back into position upon lugs 31 coming into alignment with their respective slots 30. Lugs 31, having substantially square upper edges, thereafter enter into locking engagement with their respective tabs 29 and are only removable from their respective slots by tabs 29 being bent manually outwardly thereby preventing their inadvertent release when in use.

From FIG. 1 and FIG. 4, it will seen that one lug 31a of heavier section than the remainder of the lugs 31 and its tab 29a is similarly more robust, and both are of modified shape to permit a hinge pin 33 to connect them, thereby joining body portion 12 and top entry portion 13 in hinged relationship.

Referring particularly to FIG. 3, the top entry portion 13 will be seen to comprise a segment of a quasi-spherical shell, having a short cylindrcial bottom flange 39 whose lower edge is defined by the segmenting plane and which seats on the inwardly flanged rim 28 of the body portion. The height of the segment is small in relation to either the axial depth of the trap body portion or to the diameter of flange 39. Curved wall 40 rises a distance of about a fourth or less of its greatest diameter above the rim 28. The wall of the top entry portion is similarly formed as a network of ribs and rings, and includes a relatively thickened root ring 41 lying in a plane parallel with the lowe redge of flange 39 and having an upwardly projecting integral wear flange 42.

The entrance to pot 10, designated generally as 34, comprises an inverted generally conical tubular structure 35 formed substantially centrally in top entry portion 13. The side wall of the tube structure 35 is formed by an array comprising a plurality of radially disposed, flexible tapering strips or fingers 43, which are integrally joined by their wider or root ends with the root ring 41 and which curve inwardly and downwardly toward the center of the pot 10. It is to be noted that these fingers are not joined with each other except by the root ring, and that they extend freely from their individual roots as cantilever beams. The fingers 43 are moreover arranged in serried ranks, each rank comprising a different length of finger, so that, as shown in FIGS. 1 and 3, the free ends 36 of a first group of short fingers extend into entry 34 with a greater angle to the vertical axis of the trap than do the free ends 37 of a second group of fingers which are longer than those of the first group, while the corresponding free ends 38 of the longest group extend further inwardly and downwardly than do the other fingers. The ends define a substantially cylindrical passage portion between them which is of lesser transverse dimension than the diameter of either of the openings formed by the ends 37 or 36, the latter opening being of the largest diameter.

Being resilient, the ranks of fingers as described permit lobsters and other marine life to pass into the tubular structure 35 as they progress toward the flaring entrance 34 in the top of the trap cover, then through the successive rings formed by ends 36, 37, and 38 of the easily deflected fingers 43. As the lobster or other marine life passes down below the ends of a group of fiingers, these spring back to their original position, providing a prodding action to the creature thereby encouraging it to move further down the tubular passage 35 into the pot. At the same time, should the creature attempt to back out of entrance 34, the finger ends, being relatively pointed, dig into it and thereby prevent its escape. The ends 38 of the lowest fingers, when pushed laterally by quarry which has descended into the pot 10, are designed to interleave and effectively close the lower end of the entry passage and therefore to prevent the escape of any quarry that may be therein.

We claim:

1. A combined lobster trap lid and entry for a trap of truncated conic body form, comprising a shallow segment of generally spherical shell configuration having an open bottom end and a curving wall rising upwardly and inwardly from said open end comprising a network of ribs and horizontal rings, the uppermost ring being a thickened annulus defining the upper margin of a flared tubular entry pasage coaxial with said rings, the walls of said passage comprising flexible curving fingers of tapering strip form integrally joined with said uppermost ring by their one ends and sloping inwardly and depending downwardly therefrom, said fingers comprising a plurality of groups, each of said groups having uniform length and curvature of said fingers different from the length and curvature of fingers of another group and being angularly spaced from and interspersed with other groups, the inward ends of the shortest group sloping at a lesser angle to the horizontal than the inward ends of any other group and terminating on a circle of larger diameter than the corresponding ends of other groups, the lower ends of the longest group being downwardly curved to lie in a substantially cylindrical array of restricted diameter.

2. A combined lobster trap lid and entry as defined in claim 1 wherein said segment has a height about one-fourth of the diameter of said open end and a lowermost ring comprises a depending cylindrical flange defining said bottom end adapted to seat on said trap body in closing relation and said uppermost ring has a diameter larger than the axial depth of said entry passage.

3. A combined lobster trap lid and entry as defined in claim 1 wherein said fingers comprise three groups whereof the shortest fingers are nearly straight and said longest fingers are curved through an arc of nearly 90°.

4. A lobster pot including a base portion, a body portion and a top entry portion, all fabricated from open mesh material; said base portion being substantially flat; said body portion being tubular and having open upper and lower ends; said lower end being covered by said base portion; said base portion having an integral cylindrical peripheral wall whose upper margin is formed with downwardly opening sectoral channel members uniformly angularly spaced about said periphery; said body portion having a cylindrical lower margin formed with upwardly opening, sectoral channel members uniformly angularly spaced about said margin and being detachably engageable with said base channel members by axial interfitting of respective margins of said base and said body portion and ensuing relative rotation to register all of said channel members in cupping relation, said body portion having horizontal sectoral flanges spaced above and bridging the ends of adjacent channel members, the ends of said sectoral flanges overlying the ends of said assembled channel members, whereby to prevent axial displacement of said body portion relative to said base portion.

5. A lobster pot as defined in claim 4 including a toroidal weighting ring of metal seated on said base contiguous with the inner surface of substantially the entire cylindrical wall, said wall having a height such that said assembled channel members overlie said weight ring to provide a clearance.

6. A lobster pot as defined in claim 5 further including a towing eye extending outwardly from said weighting ring and offset upwardly from the plane of said ring.

References Cited by the Examiner

UNITED STATES PATENTS

| | | | |
|---|---|---|---|
| 515,899 | 3/1894 | Breithaupt | 43—54.5 |
| 951,157 | 3/1910 | Todd | 43—65 |
| 2,123,471 | 7/1938 | Lewis | 43—100 |
| 2,950,562 | 8/1960 | Lothrop | 43—102 |

FOREIGN PATENTS

| | | |
|---|---|---|
| 134,628 | 10/1949 | Australia. |
| 206,742 | 4/1955 | Australia. |
| 338,760 | 7/1921 | Germany. |

SAMUEL KOREN, *Primary Examiner.*

UNITED STATES PATENT OFFICE
CERTIFICATE OF CORRECTION

Patent No. 3,232,000　　　　　　　　　　　February 1, 1966

Reginald Leake Gale et al.

It is hereby certified that error appears in the above numbered patent requiring correction and that the said Letters Patent should read as corrected below.

Column 4, line 11, beginning with "4. A lobster pot" strike out all to and including "of said ring." in line 40, same column 4; in the heading to the printed specification, line 7, for "6 Claims." read -- 3 Claims. --.

Signed and sealed this 24th day of May 1966.

)EAL)

.ttest:

RNEST W. SWIDER
ttesting Officer

EDWARD J. BRENNER
Commissioner of Patents